United States Patent
Diamond et al.

(10) Patent No.: US 12,005,902 B2
(45) Date of Patent: Jun. 11, 2024

(54) SYSTEM AND METHOD FOR SITUATIONALLY OPTIMIZED TURNING ASSISTANCE

(71) Applicant: Ford Global Technologies, LLC, Dearborn, MI (US)

(72) Inventors: Brendan Diamond, Grosse Pointe, MI (US); Keith Weston, Canton, MI (US); Matthew Johnson, Toledo, OH (US); Andrew Monticello, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 17/226,258

(22) Filed: Apr. 9, 2021

(65) Prior Publication Data

US 2022/0324452 A1 Oct. 13, 2022

(51) Int. Cl.
*B60W 30/18* (2012.01)
*B60L 15/20* (2006.01)
*B60W 10/119* (2012.01)

(52) U.S. Cl.
CPC ....... *B60W 30/18145* (2013.01); *B60L 15/20* (2013.01); *B60W 10/119* (2013.01); *B60W 2420/403* (2013.01); *B60W 2540/18* (2013.01); *B60W 2540/215* (2020.02); *B60W 2552/40* (2020.02); *B60W 2720/26* (2013.01); *B60W 2720/30* (2013.01); *B60W 2720/403* (2013.01); *B60W 2720/406* (2013.01)

(58) Field of Classification Search
CPC ......... B60W 30/18145; B60W 10/119; B60W 2420/42; B60W 2540/18; B60W 2540/215; B60W 2552/40; B60W 2720/26; B60W 2720/30; B60W 2720/403; B60W 2720/406; B60L 15/20
See application file for complete search history.

(56) References Cited

U.S. PATENT DOCUMENTS

| | | | |
|---|---|---|---|
| 5,265,694 A * | 11/1993 | Yamashita | B60T 8/175 180/197 |
| 7,386,379 B2 | 6/2008 | Naik et al. | |
| 10,272,942 B2 | 4/2019 | Lian et al. | |
| 2003/0062768 A1* | 4/2003 | Loudon | B60T 8/1755 303/146 |
| 2004/0002804 A1* | 1/2004 | Walenty | B60T 8/172 303/121 |

(Continued)

FOREIGN PATENT DOCUMENTS

EP 0794104 A2 10/1997
JP 4967862 B2 7/2012

*Primary Examiner* — Ig T An
*Assistant Examiner* — Christine Nguyen Huynh
(74) *Attorney, Agent, or Firm* — Burr & Forman LLP; Lorne Forsythe

(57) ABSTRACT

A vehicle control system for reducing turn radius of a vehicle may include electric motors associated with front and rear wheels of the vehicle. The system may further include a plurality of vehicle sensors to receive information including driving surface type, vehicle speed and handwheel position. The system may also include a controller operably coupled to the electric motors and the sensors to control wheel slip during a turn based on the driving surface type, the vehicle speed and the handwheel position.

19 Claims, 7 Drawing Sheets

(56) References Cited

U.S. PATENT DOCUMENTS

| | | | |
|---|---|---|---|
| 2011/0276245 A1* | 11/2011 | Krueger | B60T 8/17616 |
| | | | 701/71 |
| 2014/0145498 A1* | 5/2014 | Yamakado | B60T 8/245 |
| | | | 303/3 |
| 2016/0082972 A1* | 3/2016 | Fairgrieve | B60W 50/14 |
| | | | 701/84 |
| 2016/0152238 A1* | 6/2016 | Mita | B60W 10/06 |
| | | | 180/197 |
| 2018/0201255 A1* | 7/2018 | Lian | B60K 17/34 |

* cited by examiner

SYSTEM AND METHOD FOR SITUATIONALLY OPTIMIZED TURNING ASSISTANCE

TECHNICAL FIELD

Example embodiments generally relate to vehicle control technology and, more particularly, relate to a system and method for selectively providing a reduced turning radius that depends at least in part on the surface upon which the turn is being conducted.

BACKGROUND

Vehicles with a relatively long wheelbase, such as trucks, often also have large turning radiuses. This can make such vehicles difficult to park or maneuver in relatively tight spaces. Such vehicles may also struggle to complete a U-turn in certain situations. Larger front wheel drive vehicles may also face similar issues. Although some techniques have been developed for improving performance in tight spaces, such techniques typically involve locking the inside rear wheel. Not only can this practice flat spot the tire, but it can also be highly abrasive to the terrain on which the technique is performed.

Accordingly, it may be desirable to define a strategy for providing turning radius reduction that can be implemented to provide a more satisfying user experience for drivers of these and other vehicles.

BRIEF SUMMARY OF SOME EXAMPLES

In accordance with an example embodiment, a vehicle control system for a vehicle may be provided. The system may include electric motors associated with front and rear wheels of the vehicle. The system may further include a plurality of vehicle sensors to receive information including driving surface type, vehicle speed and handwheel position. The system may also include a controller operably coupled to the electric motors and the sensors to control wheel slip during a turn based on the driving surface type, the vehicle speed and the handwheel position.

In another example embodiment, a method of providing automated application of turn radius reduction for a vehicle may be provided. The method may include receiving a mode selection selecting a turning radius reduction mode and receiving steering wheel angle and vehicle speed information to determine if turn radius reduction criteria are met during a turn. The method may further include determining a surface type on which the vehicle is operating and, in response to the turn radius reduction criteria being met, applying a torque differential to at least an inside rear wheel and an outside rear wheel of the vehicle based on the steering wheel angle, the vehicle speed information and the surface type. Notably, example embodiments may be practiced in connection with 4 motor battery electric vehicle (BEV), 3 motor BEV, 2 motor BEV, 2 Motor Hybrid, single motor Hybrid, conventional internal combustion engine (ICE) powertrain, ICE powertrain with torque vectoring, ICE powertrain with electronic limited slip differential (eLSD), ICE powertrain with open differentials, and/or the like.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3A:
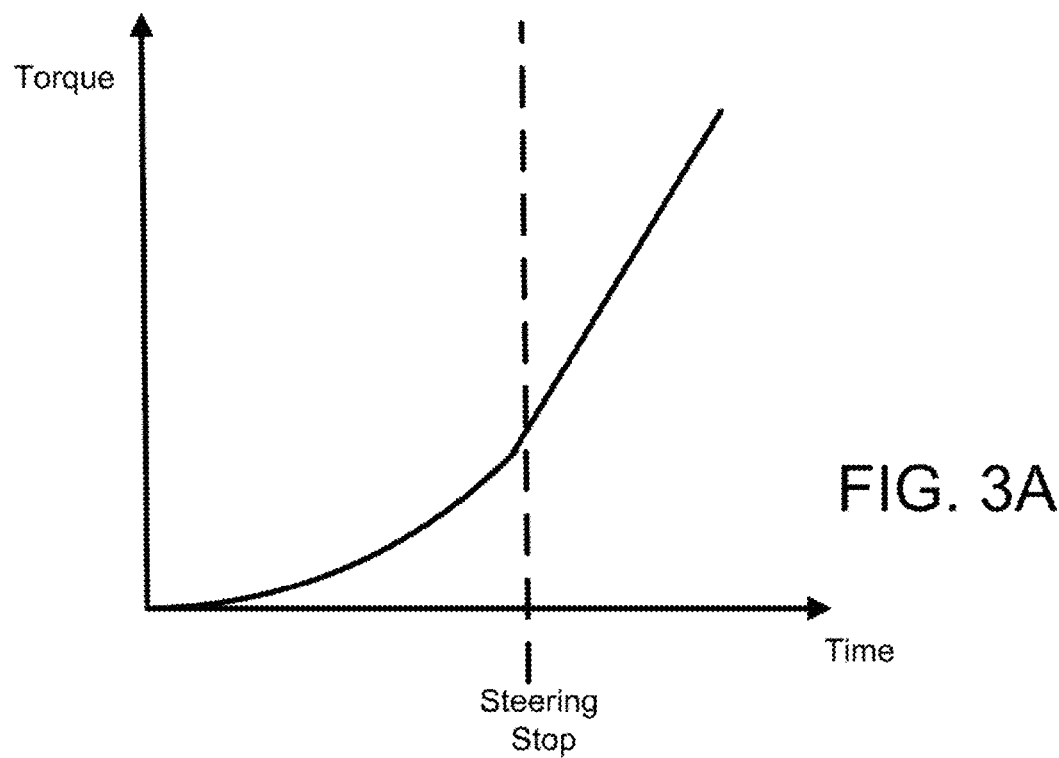
Figure 3B:
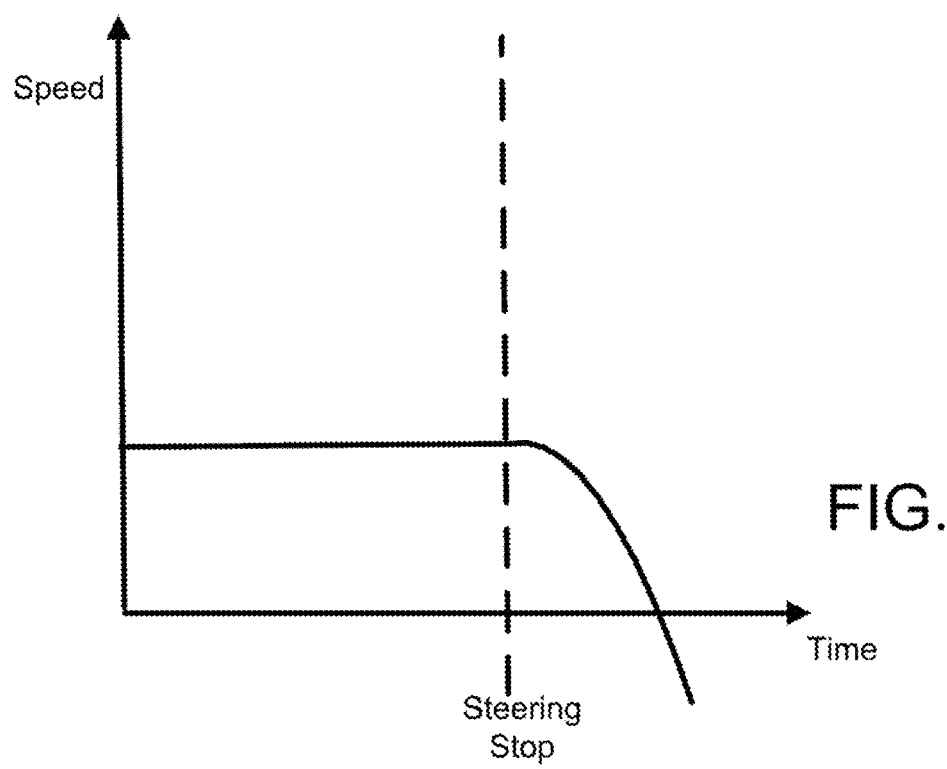
Figure 4:
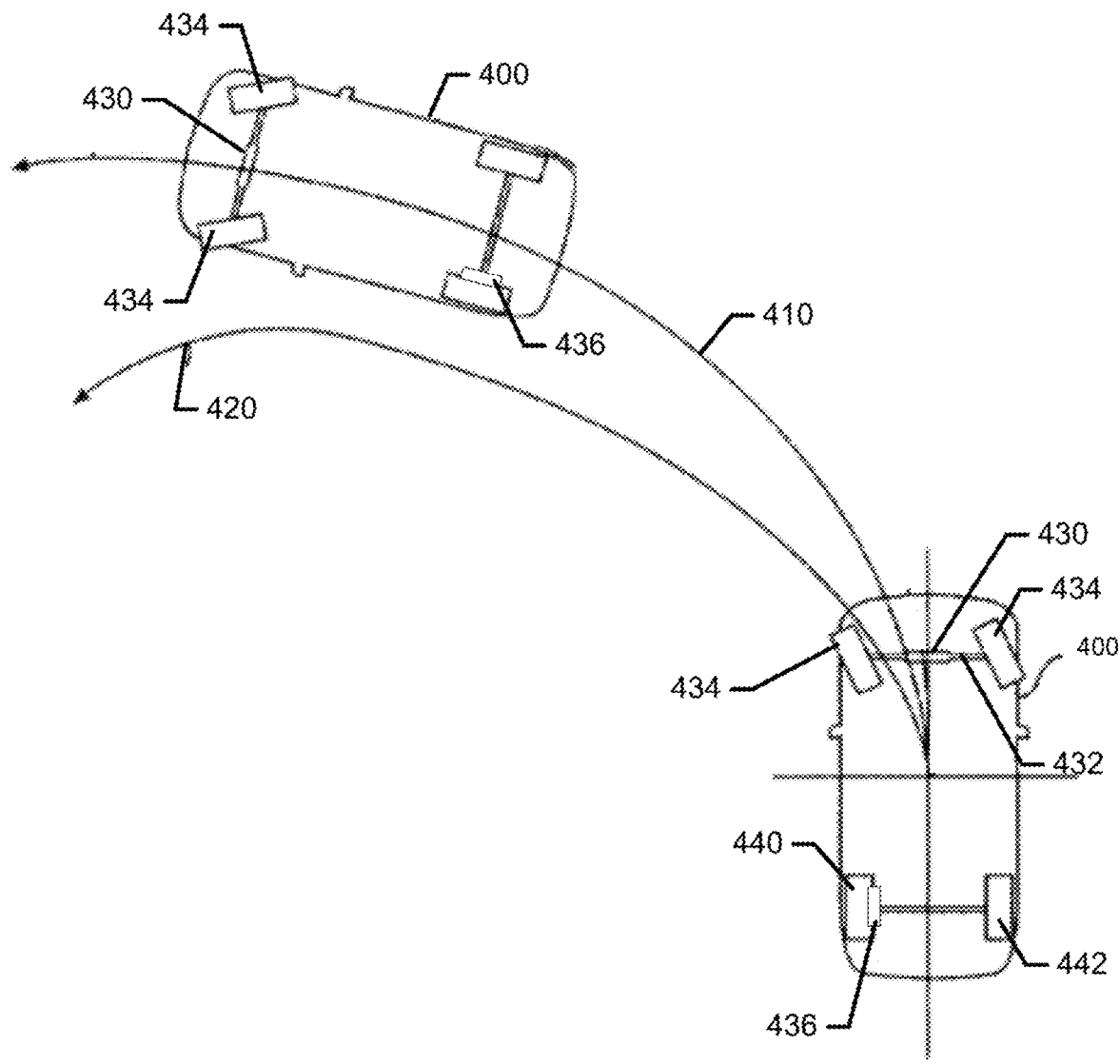
Figure 5:
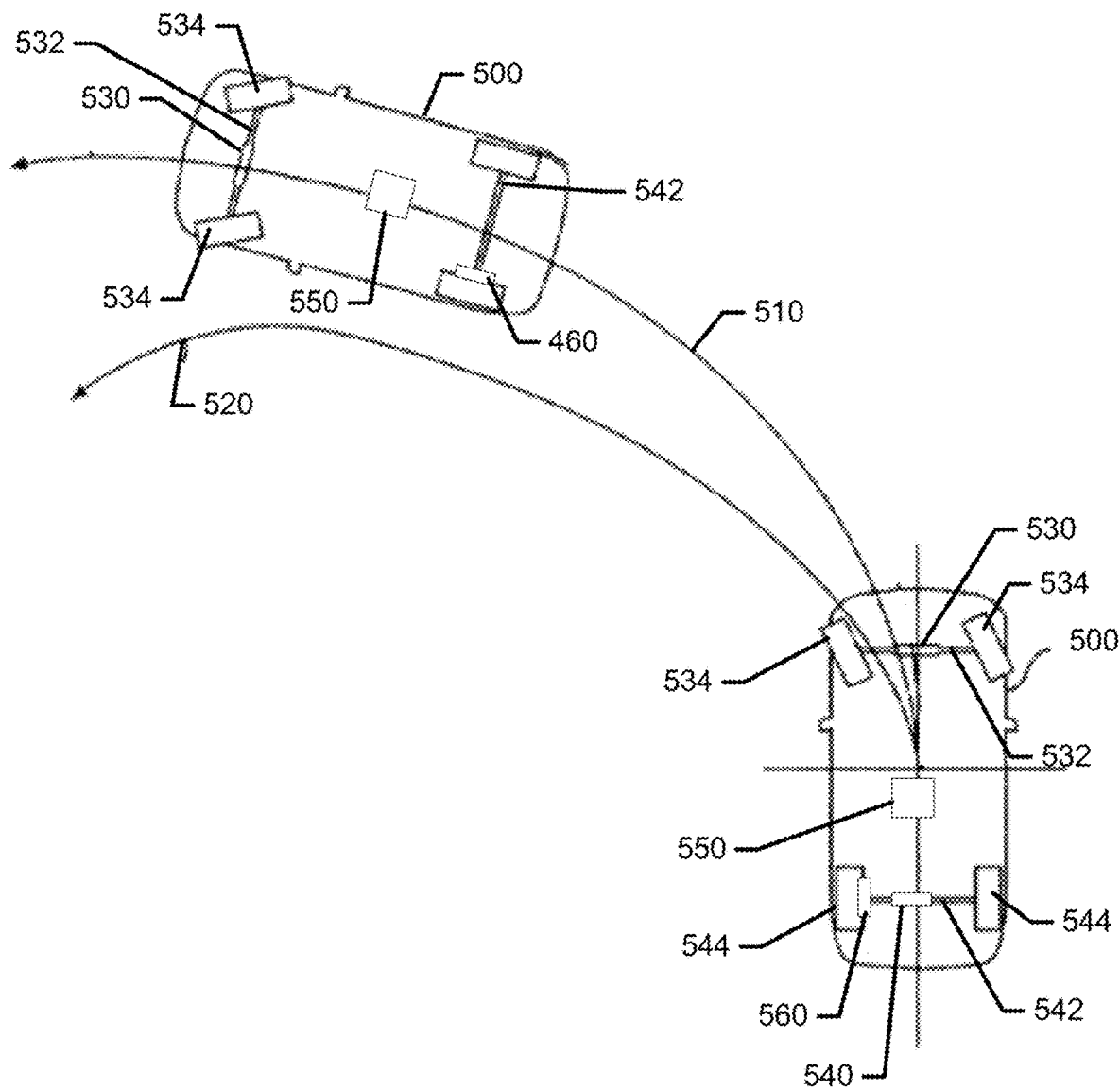
Figure 6:
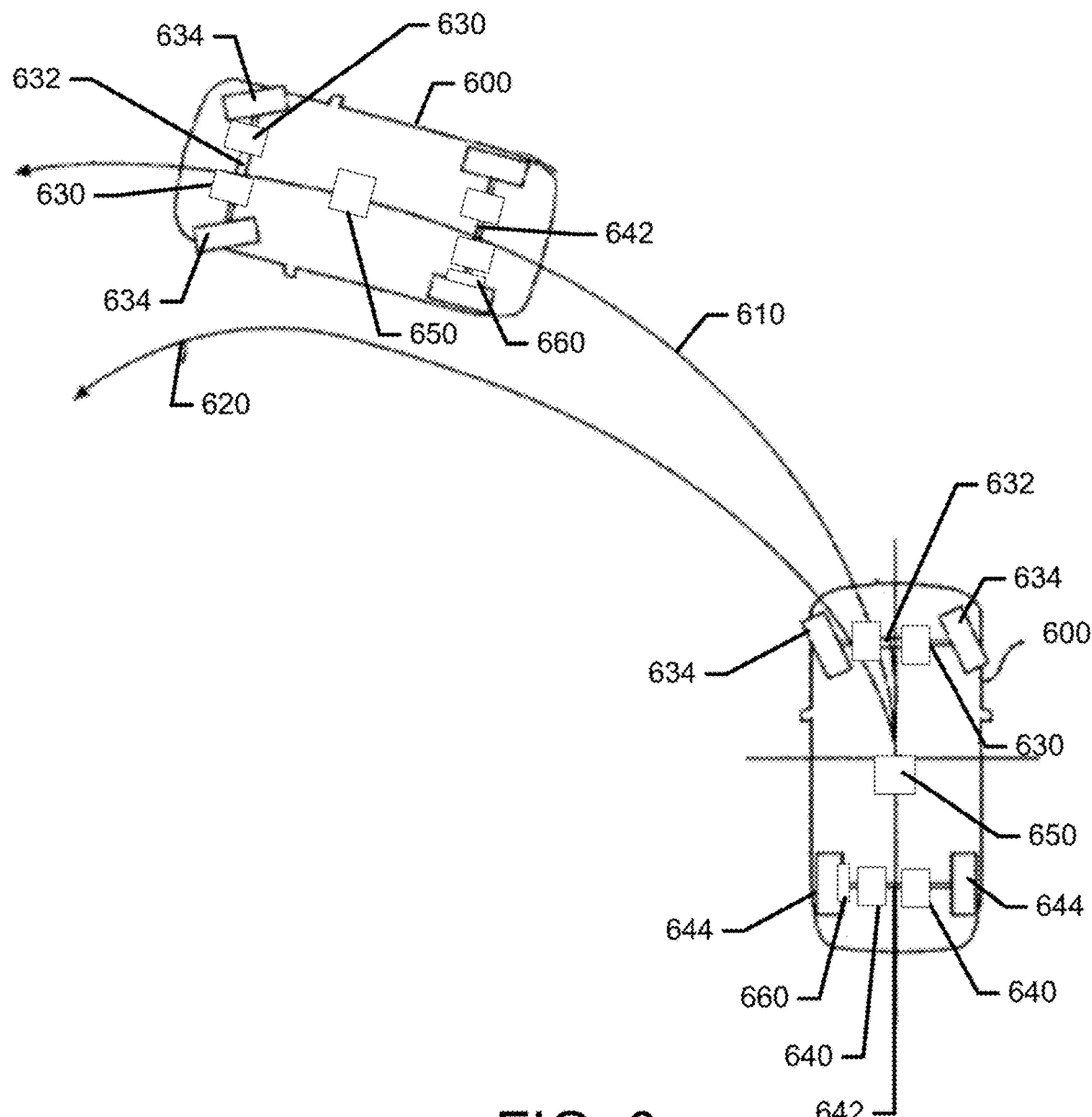
Figure 7:
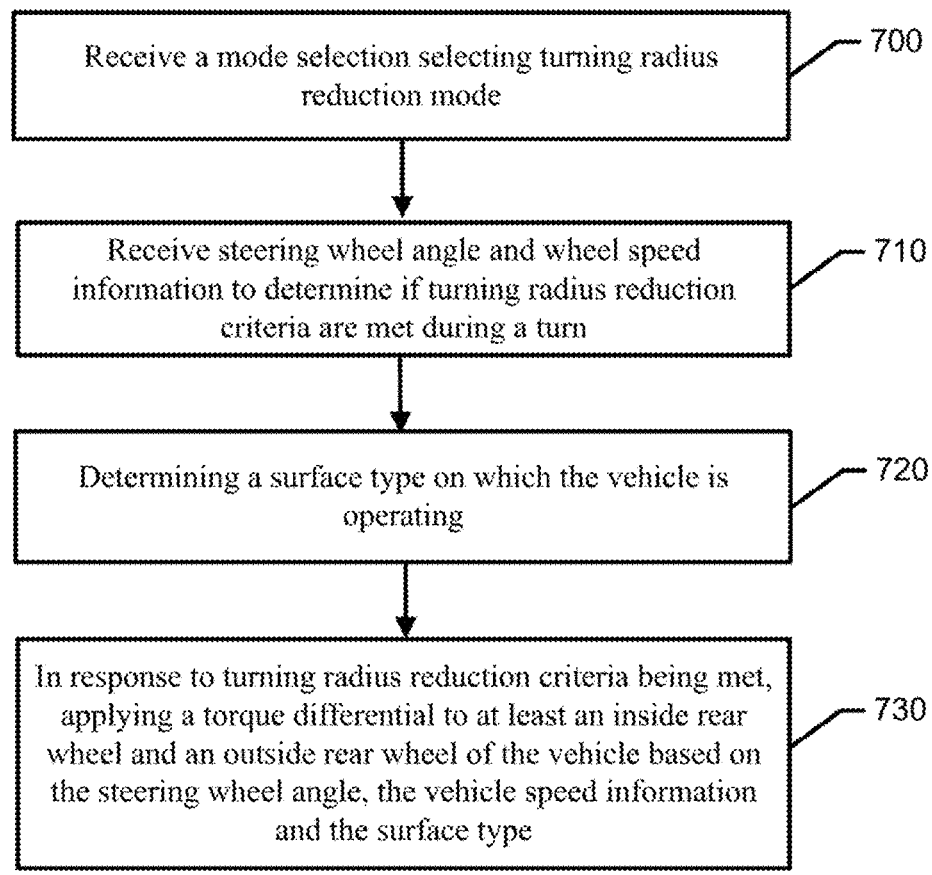

FIG. 3, which is defined by FIGS. 3A and 3B, illustrates plots of handwheel torque and speed versus time in accordance with an example embodiment;

FIG. 4 illustrates a front wheel drive vehicle performing a reduced radius turn in accordance with an example embodiment;

FIG. 5 illustrates a plot of battery electric vehicle tracks during a normal turn and during a turn with reduced radius of an example embodiment;

FIG. 6 illustrates a different battery electric vehicle than that of FIG. 5 conducting the normal turn and reduced radius turn in accordance with an example embodiment; and FIG. 7 illustrates a method of controlling a vehicle in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to define strategies that enable turning radius reduction to be selectively and strategically provided for vehicles. Such strategies may work particularly well in tight spaces, but may also be very helpful for extreme off-road activities such as rock crawling. That said, strategies that may work in these contexts may also work for vehicles in other settings as well. Thus, example embodiments are not strictly limited to application in any particular vehicle setting. Moreover, although some example embodiments may work particularly well on battery electric vehicles (BEVs) due to certain aspects of the structures of these vehicles, the general principals described herein can also be applied to other vehicle types as well.

It may be possible to use positive and negative torque applied to individual wheels or axles to assist in turning radius reduction. Moreover, as noted above, one common way to do reduce turn radius is to lock the inside rear wheel alone when conducting a turn. However, doing so may flat spot a tire, or mar the surface on which the vehicle is operating. Thus, it may be desirable to provide a system capable of improving the performance of vehicles relative to performance of reduced turning radius maneuvering. Example embodiments may provide such improvement by enabling strategic control of both positive and negative torque applied to the wheels of front and rear axles during a turn. Moreover, in some cases, the speed of each individual wheel may selectively be controlled in order to optimize turning capabilities for the vehicle. These speeds may be controlled by monitoring (and controlling) slip for front wheels and/or rear wheels of the vehicle. Slip is a measure of the difference in speed between certain wheels, and may be controlled precisely, e.g., by applying a positive or negative torque to the selected wheels during a turn. For example, a negative torque may be applied to slow (but not stop) the inside rear wheel, while enabling different amounts of positive (or negative) torque to be applied the front wheels to pull the vehicle through the turn, while the outside rear wheel may have still a different speed applied thereto. By controlling slip in this way, not only can the vehicle turning radius be reduced, but the user experience during the application of the turning radius reduction may also be improved.

Example embodiments may therefore provide strategic control of the application of torque (both positive and negative) to improve turning radius reduction in terms both of the quantitative changes to the turning radius itself, and also the qualitative changes that are associated with the experience of employing the strategy. However, example embodiments may also provide a unique capability for changing the strategy employed based on the surface upon which the vehicle is operating. In this regard, for example, the vehicle may employ sensors that enable a determination regarding the surface (e.g., the type of surface with respect to various known classifications of surface type) so that the control of slip mentioned above can be specifically tailored to the surface type. In practice, the vehicle will adaptively adjust the strategies employed for turning radius reduction to the surface type.

Some example embodiments may therefore provide a system that is not only capable of providing reductions in vehicle turning radius, but is further capable of doing so in an automatic fashion that is seamless for the driver while being adaptive to the surface on which the vehicle operates. In this regard, for example, when enabled by the driver, a controller of the system of example embodiments may be configured to automatically apply positive and/or negative torque to individual wheels during a tight turn in order to optimize the turning radius. Moreover, the application of such torques, may be dependent upon the surface type determined for the surface upon which the vehicle is operating. In some cases, the torque applications may be determined based on or otherwise incorporate or consider wheel slip, for front and/or rear wheels, and surface type. For example, wheel slip may be determined for the rear inside wheel relative to the outside rear wheel and for the inside front wheel relative to the outside front wheel, and may be controlled during application of the turning radius reduction strategy based on the surface type.

Figure 1:
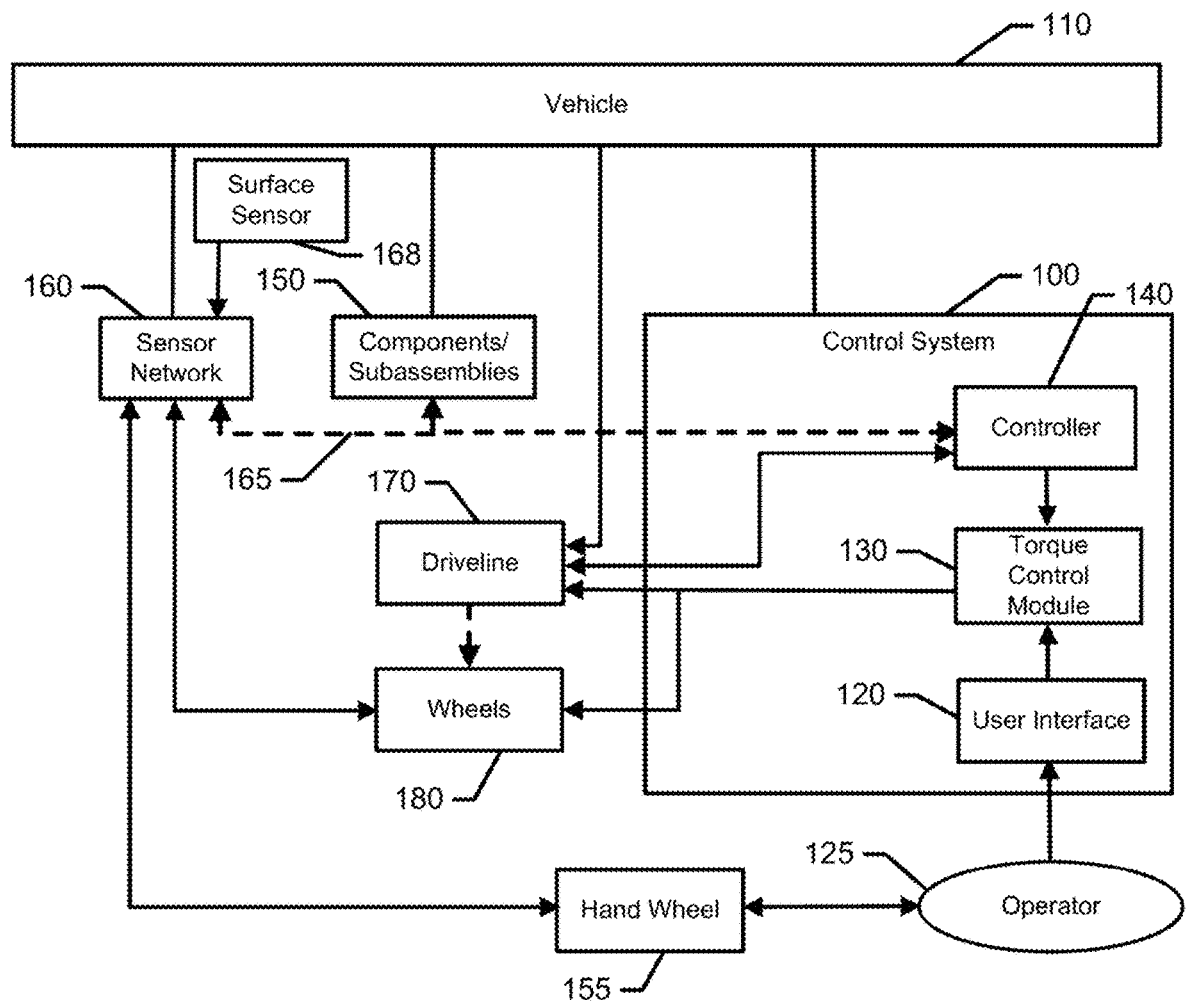
FIG. 1 illustrates a block diagram of a vehicle control system in accordance with an example embodiment.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals and the steering wheel (or hand wheel 155). The pedals may include a brake pedal and an accelerator pedal pivotally mounted to the floor of the vehicle 110, and operable by an operator 125. However, it should be appreciated that the brake pedal and/or accelerator pedal could alternatively be mounted to other locations (e.g., an instrument panel, a cross car beam, a dashboard, or other such location). The brake pedal may generally be used to provide inputs for control of braking torque, and the accelerator pedal may be used to provide inputs for control of propulsive torque. However, the normal mode of operation may not be desirable for all cases. Moreover, selectable other modes of operation, including one or more off-road driver assistance modes, parking modes, turn assist modes, etc., may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include a turn assist mode, in which turn radius reduction may be initiated as described in greater detail below.

Of note, although the term turn assist mode will generally be referred to herein as being the mode in which example embodiments are performed, the name of the mode in which example embodiments may be applied is not important, and certainly not limiting. As noted above, other terms like brake-steering mode, parking mode, or any other mode in which the functionality described herein is applied, are also possible.

The control system 100 of example embodiments may also include the torque control module 130, which may be part of or otherwise operably coupled to a controller 140. The torque control module 130 may be configured to determine positive torque (e.g., propulsive torque) and/or negative torque (e.g., brake torque, regenerative torque, etc.) to be applied to the wheels, individually, in pairs or collectively (e.g., depending on driveline state and/or vehicle type) as described herein based on inputs from any or all of the controller 140, the user interface 120 or other components of the vehicle 110. As will be discussed in greater detail below, the torque control module 130 may use slip measurements and surface type as a basis for defining torque applications to be applied to wheels (individually and/or in pairs) to control slip during turns. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165. In an example embodiment, one of the sensors of the sensor network 160 may include a surface sensor 168.

The surface sensor 168 may be a camera in some cases. For example, the camera may capture image data for the area ahead of the vehicle for analysis to determine surface type or a classification indicative of surface type. In other examples, the surface sensor 168 may be a signal sensor configured to determine the surface type based on wheel speed signal quality. For example, high frequency noise in wheel speed signals may be indicative of a rough surface (e.g., gravel or dirt) if seen on all such sensors at the same time (since one sensor being different may indicate a broken sensor). The determination of surface type may, in some examples, be made by the controller 140. However, in other cases, the surface sensor 168 may itself include, or may be in communication with, dedicated processing circuitry that is configured to make determinations of surface type based on the image data (or other input information).

In some cases, the surface type may be simply determined as paved or unpaved. However, in other cases, the surface type may further include a quality rating or assessment regarding the paved or unpaved condition. For example, paved and unpaved classifications may further be rated as good, fair or poor. In such context, good may indicate a relatively smooth surface with few potholes, cracks or other discontinuities. A fair rating may indicate a relatively small amount of potholes, cracks or other discontinuities, and a poor rating may indicate an abundance of potholes, cracks or other discontinuities including the existence of obstacles (e.g., rocks, branches, or other objects).

In still other examples, the surface type may be more specifically classified. For example, the surface type may be classified as asphalt, concrete, gravel, dirt, sand, grass, or various other types. A quality rating may again be applied to the more detailed classification to provide further granularity with respect to the surface type on which the vehicle 110 is operating.

The components or subassemblies 150 may include, for example, the steering wheel of the vehicle, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or the torque control module 130. In some cases, the brake assembly may include an electric brake boost (EBB) system, which uses electric brake boosters to sense driver input and reduce the amount of pedal pressure needed for braking. The propulsion system may include a gas engine, electric motor, or any other suitable propulsion device. However, as will be noted below, the enhanced control of individual wheel speeds that can be offered in certain battery electric vehicles (BEVs) may make such BEVs well suited for operating example embodiments.

The controller 140 and/or torque control module 130 may be configured to determine positive and negative torque inputs for provision to components of a driveline 170 (e.g., driveshaft, transmission, differential(s), axle shaft(s), etc.) and wheels 180 of the vehicle 110. Thus, for example, the torque control module 130 may determine positive torque inputs for provision to the propulsion system to apply propulsive torque to the wheels 180 of the wheel assembly of the vehicle 110 via the driveline 170, and determine negative torque inputs for provision to the wheels 180 in the form of braking torque, regenerative torque, or the like. Moreover, one or more corresponding sensors of the sensor network 160 that may be operably coupled to the brake assembly and/or the wheel assembly may provide information relating to brake torque, brake torque rate, vehicle velocity, vehicle acceleration, individual wheel speeds, front/rear wheel speeds, vehicle pitch, etc. Other examples of the components or subassemblies 150 and/or corresponding sensors of the sensor network 160 may provide information relating to yaw, lateral G force, steering wheel angle, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 (e.g., based on mode selection, steering wheel angle, speed, etc.) relative to control of various aspects of operation of the vehicle 110 and then be configured to use the information received in association with the execution of one or more control algorithms that may be used to provide instructions to the torque control module 130 in order to control application of positive and negative torque to the wheels of the wheel assembly of the vehicle 110.

In an example embodiment, the operator 125 may use the user interface 120 to select the turn assist mode. The user interface 120 may be embodied by an interactive display in the vehicle 110, and may therefore be a soft switch provided on the display. However, in other examples, the user interface 120 may include a hard switch, a button, key, or other selectable operator located in the cockpit of the vehicle 110. Selection of the turn assist mode may correspondingly activate the torque control module 130 to provide the automated turning control described herein based on information provided by the components or subassemblies 150 and/or corresponding sensors of the sensor network 160. More specifically, selection of the turn assist mode may enable control of turning capabilities based on vehicle speed, steering wheel position, and a control of negative torque and/or positive torque to selected ones of the wheels to control slip. Operation of the torque control module 130 will be described in greater detail below in reference to FIG. 2.

As noted above, when the torque control module 130 is active, and automated turning controls have been activated, outputs of the torque control module 130 may be provided to components of the driveline 170 of the vehicle 110. The controller 140 may therefore receive information to enable the controller 140 to determine a state of the driveline 170 of the vehicle 110, or the specific driveline characteristics for the type of vehicle involved may be programmed into the algorithms that are executable by the controller 140. The driveline 170 may include front and rear axles and various drive components for the front and rear axles and/or the components that provide coupling therebetween. Thus, for example, the driveline 170 may include a differential (e.g., a front differential for a front wheel drive vehicle) and gears and/or clutch components that operably couple the front and rear axles (and/or their driving components). In some examples, such as when the vehicle 110 is a BEV, the driveline 170 may include individual electric motors for either each axle or even each wheel.

Figure 2:
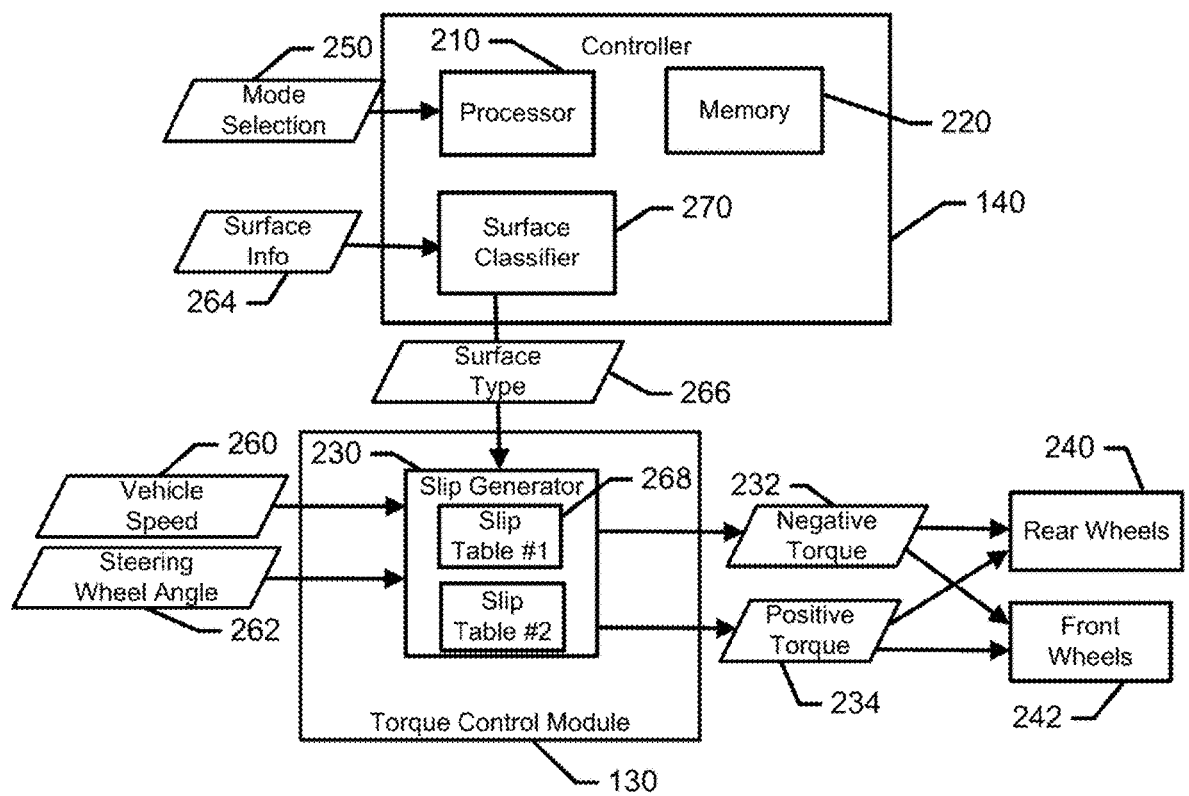
FIG. 2 illustrates a block diagram of some components of the vehicle control system of FIG. 1 in accordance with an example embodiment.

Referring now to FIG. 2, operation of the controller 140 and the torque control module 130 will be described in greater detail. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 210 and memory 220) at the controller 140 may process the information received by running one or more control algorithms.

The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received/generated regarding specific conditions of vehicle components. The control algorithms may therefore execute various functions based on the information received, and generate outputs to drive the control of torque applied at the wheels of the vehicle 110 (e.g., individually or in pairs). The torque control module 130 may itself be a control algorithm, or may include control algorithms in the form of functional modules (or sub-modules) configured to perform specific functions for which they are configured relating to control of the vehicle 110 in the manner described herein. Thus, for example, the controller 140 may actually function as the torque control module 130 responsive to executing the control algorithms. However, in other cases, the torque control module 130 may be a component or module of the controller 140, or an entirely separate component (e.g., including its own corresponding processing circuitry).

In an example embodiment, the torque control module 130 may include a turn enhancer or slip generator 230 that defines a negative torque value 232 and/or a positive torque value 234 to be applied to for application to inside and outside rear wheels 240, and/or inside and outside front wheels 242 in order to generate desired slip and therefore increased yaw or turn rate for the vehicle 110 during a turn. The slip generator 230 may be configured to generate the negative torque value 232 and/or the positive torque value 234 only when a mode selection 250 has been made to place the vehicle 110 (e.g., via its controller 140) in the turn assist mode (or other similar mode), and when certain other qualifying conditions have been met (e.g., a trigger event or trigger condition). For example, the slip generator 230 may further receive inputs including vehicle speed 260 and steering wheel angle 262. The vehicle speed 260 may, in some cases, include wheel by wheel speed measurements. However, in other cases, the vehicle speed 260 may be the overall speed of the vehicle 110 as determined by a speedometer reading, GPS, velocimetry, accelerometers, and/or the like.

The turn assist mode may, for example, only be operable below a certain or threshold speed (e.g., below 10 miles per hour (mph), or another suitable speed value). Moreover, in some cases, the turn assist mode may only be operable (and therefore the slip generator 230 only active), when a turn of sufficient magnitude (at the low speed defined by the threshold value for vehicle speed 260). For example, the slip generator 230 may only operate when the steering wheel (e.g., hand wheel 155 of FIG. 1) has been turned to a maximum extent (or to a predetermined angle proximate to the maximum angle) in one direction or the other. Moreover, in some cases, the amount of steering torque exerted after reaching the steering stop (in either direction) may be measured, and may influence the amount of desired slip that is to be generated by the slip generator 230. In this regard, for example, the amount of steering torque exerted after reaching the steering stop may determine a slip value translates into specific controls for speeds of the individual wheels (e.g., inside and outside rear wheels 240 and/or inside and outside front wheels 242) as controlled by the application of the negative torque value 232 and/or the positive torque value 234 to the inside and outside rear wheels 240 and/or inside and outside front wheels 242. Thus, the steering wheel angle 262 and the vehicle speed 260 may only be enabling factors or trigger criteria when specific measurements or threshold for either or each are reached for operation of the slip generator 230.

In an example embodiment, the slip generator 230 may provide a control output in terms of torque values (e.g., the negative torque value 232 and/or the positive torque value 234), and the torque values may be determined based on one or more slip tables. In this regard, the torque values defined may be aimed at driving a target slip for one or both sets of wheels (e.g., the inside and outside rear wheels 240 and/or inside and outside front wheels 242). Alternatively or additionally, the torque values defined by be aimed at driving specific wheel speeds for each wheel among one or both sets of wheels (since doing so will necessarily also achieve the target slip. Thus, regardless of whether the paradigm is to use torque controls to drive slip or wheel speeds, it should be appreciated that the controls employed result in control over the wheels speeds that will improve turn radius characteristics as described in greater detail below.

In an example embodiment, the slip generator 230 may provide the control output (e.g., the negative torque value 232 and/or the positive torque value 234) based on a combination of driver intent and a current operational context. The driver intent may be or inferred determined (by the controller 140 or slip generator 230) based on the mode selection 250 and the steering wheel angle 262 in some cases. In this regard, if the mode selection 250 is made to enable turn assistance as described herein (i.e., the turn assist mode is selected), then it can be assumed that the driver intends for operation of the slip generator 230 to reduce vehicle turn radius when other corresponding conditions are met. One such condition may include the steering wheel angle 262 defining a value indicative of the driver's intent to reduce the turning radius of the vehicle 110. In an example embodiment, the value indicative of the driver's intent to reduce the turning radius may be the maximum turning angle (or a value close thereto). In this regard, if the driver has selected the turn assist mode and then also moves the steering wheel (or hand wheel 155) to the stops (i.e., the maximum turning angle), then it may be a good assumption that the driver intends to employ turning assistance as described herein. However, in some cases, the sensor network 160 may include a torque sensor that is configured to detect a torque level applied to the hand wheel 155 when at the stops. In such an example, the amount of torque sensed by the torque sensor may further indicate driver intent. Moreover, a certain amount of minimum torque may be required to initiate turning assistance so that movement to the stop does not initiate turning assistance until the minimum torque is reached. Additionally or alternatively, the amount of torque applied may be used to determine the amount of change in speed that should be applied to any given wheel. In an example embodiment, the relationship between torque and speed may be non-linear (as shown in FIG. 3 below). However, linear or other relationships may also be defined in some cases. In cases where the amount of torque is employed, the steering wheel angle 262 may include the amount of torque.

The current operation context may be determined or inferred (again by the controller 140 or slip generator 230) based on surface information 264 and vehicle speed 260 in some embodiments. In this regard, the vehicle speed 260 may indicate that the vehicle 110 is operating below a threshold speed (e.g., 10 mph) that allows the slip generator 230 to be enabled or otherwise be activated. Meanwhile, the surface information 264 may provide specific information that is used by the slip generator 230 to tailor the slip generation or speed control of the wheels to the surface upon which the vehicle 110 is operating. In an example embodiment, the surface information 264 may be provided by the surface sensor 168 of FIG. 1. The surface information 264 may indicate a surface type 266 (and rating if applicable), or may include information or data that can be used to determine the surface type 266 (and rating). In examples in which the surface type 266 is determined from the surface information 264, the surface information 264 may be provided to a surface classifier 270. The surface classifier 270 may be a portion of the controller 140, or may stand alone. However, in other cases, the surface information 264 may be determined based on the location of the vehicle 110. For example, a GPS location of the vehicle 110 may correlate to a road having a known road surface, or another geographic location that is known to include a certain surface type (e.g., sand on a beach, rocks or dirt in an off-road area, etc.). In still other examples, the surface information 264 may be determined from the mode selection 250. For example, the mode selection 250 could include a setting for rock crawling, driving in sand, parking, etc., where each setting correlates to a respective different surface type.

The slip generator 230 may be configured to generate the control output (e.g., the negative torque value 232 and/or the positive torque value 234, or other specific wheel speed instructions) based on the driver intent and the current operational context using an algorithm programmed for such task. The algorithm could include one or more formulas that may be tailored to specific circumstances (e.g., to the operational context). In such an example, the operational context may be determined, and then a corresponding formula or set of formulas may be used to calculate the control output. In some embodiments, instead of formulas (or in addition thereto), one or more look up tables may be used. In this regard, for example, look up tables in the form of slip tables 280 (e.g., slip table #1 and slip table #2 in FIG. 2) may be employed in some embodiments.

In an example embodiment, a different one of the slip tables 280 may be selected by the slip generator 230 based on the operational context (e.g., surface type 266). Thus, for example, slip table #1 may correspond to a paved road in good condition, and slip table #2 may correspond to an unpaved road in poor condition. Numerous other slip tables 280 may be defined for respective different surface types 266. In some embodiments, a different slip table for each surface type may also be defined based on speed (or ranges of speed). Other ways of correlating slip tables 280 to respective different operational contexts are also possible. For example, the mode selection 250 may influence slip table selection based on the driver selecting a mode that indicates a corresponding different desired approach for managing slip. In this regard, the mode selection 250 may include selections for aggressive, minimal tread, reduced tire wear, or other situations that may each have corresponding slip tables that are related thereto.

In examples involving slip tables, the slip generator 230 may, after selecting the slip table 280 to be used, enter into the slip table 280 with the vehicle speed 260 and steering wheel angle 262 (which as noted above may include an amount of torque applied by the driver if the hand wheel 155 is at the mechanical stops). Based on these entry values, the table may output a corresponding value for the positive torque 234 and/or the negative torque 232 that is to be applied to each or any controllable wheel. Thus, for example, in embodiments where the vehicle 110 is a BEV, and the BEV has four electric motors (i.e., one for each wheel), the slip generator 230 may define the control output as a torque value to be applied to each one of the four electric motors to drive a desired slip value for both the inside and outside rear wheels 240 and/or inside and outside front wheels 242 individually. Negative torque may be applied either via regenerative braking, friction brakes, or any other suitable means. For example, in some cases, negative torque may be applied by operating the electric motor in a reverse direction. However, if the BEV does not have an electric motor for each respective wheel, slip may be driven instead by applying positive torque to both wheels that share an axle (for example), but applying brake friction to the inside wheel. Some specific examples are described in greater detail below in FIGS. 4-6.

As noted above, the amount of torque applied through the hand wheel 155 may be used to determine the amount of change in speed that should be applied to any given wheel. FIG. 3, which is defined by FIGS. 3A and 3B, shows plots that illustrate the relationship between torque and speed for a given turn. As shown in FIG. 3A (which is a plot 300 of torque vs. time for a given turn), the driver may turn the hand wheel 155 with increasing torque until the steering stop 310 is reached. The driver may, wanting to decrease the turn radius of the turn, then continue to apply torque to the hand wheel 155 at the steering stop 310. The increasing torque (which happens to be linearly increasing) is shown in the plot 300 of FIG. 3A.

Based on entry into the corresponding selected slip table (which is selected based on the surface type 266 as noted above), the speed may be determined for a corresponding wheel. FIG. 3B is a plot 320 of speed (for the inside rear wheel in this case) of the wheel vs. time. As shown in FIG. 3B, the wheel has a constant speed up until the steering stop 310 is reached since the slip generator 320 is not enabled (and therefore does not operate) until the steering stop 310 is reached. However, when the steering stop 310 is reached, the slip generator 320 begins to define the control output (again based on the selected slip table, as described above). The control output for the inside rear wheel rapidly (and non-linearly) decreases the speed of the inside rear wheel until the point at which the inside rear wheel actually turns in the reverse direction (i.e. at point 330). Although the decrease in speed could be caused by negative torque applied in any suitable way, because the wheel speed goes negative at point 330, this example must correspond to the driving of the electric motor of the inside rear wheel in the reverse direction after point 330.

FIGS. 4-6 each illustrate a corresponding different example of the forms that could be taken in some example embodiments. Referring first to FIG. 4, a front wheel drive vehicle 400 (as one example of vehicle 110) is shown while conducting a turn. A normal (unmodified) turn radius 410 is shown for comparison to a modified turn radius 420.

The front wheel drive vehicle 400 has a front differential 430 and front axle 432 to which front wheels 434 are attached. Power from a drive shaft of the front wheel drive vehicle 400 is provided to the front wheels 434 responsive to the positive torque value 234 discussed above, while the negative torque value 232 is provided via inside rear brake 436.

The modified turn radius 420 illustrates (not necessarily to scale) the expected decrease in turn radius that can be achieved by applying the negative torque value 232 to the inside rear wheel 440 during the turn. Of note, slip in this example is determined by comparing the speed of the inside rear wheel 440 to a speed of the outside rear wheel 442. But other ways of determining slip could be used in other examples. As shown in FIG. 4, the positive torque value 234 applied to the front wheels 434 pulls the vehicle 300 through the turn while the negative torque value 232 applied to the inside rear wheel 340 increases the yaw rate to cause turning at the modified turn radius 420, which is smaller than the normal turn radius 410.

Referring now to FIG. 5, a BEV 500 (as another example of vehicle 110) is shown while conducting a turn. A normal (unmodified) turn radius 510 is shown for comparison to a modified turn radius 520. The BEV 500 has a front electric motor 530 that drives a front axle 532 (and the front wheels 534 attached thereto) and a rear electric motor 540 that drives a rear axle 542 (and rear wheels 544 attached thereto). The BEV 500 also has a controller 550 (e.g., an example of controller 140) that controls the application of power to the front and rear axles 532 and 542. In an example embodiment, the controller 550 may execute control (e.g., via the slip generator 320) over balancing the application of power to the front electric motor 530 and the rear electric motor 540. In other words, the controller 450 may provide for a connection (at least from a control perspective) between the front axle 532 and rear axle 542.

Each of the front wheels 534 and rear wheels 544 may also have a corresponding friction brake and/or regenerative brake assembly associated therewith. The inside rear wheel for the turn demonstrated includes a brake assembly 560 that can be individually operated to provide the negative torque value 532 discussed above. When a reduced turning radius is desired, and conditions described above in reference to FIG. 2 are met, the torque control module 130 described above may operate in similar fashion to the description above. However, since the front and rear axles 532 and 542 are each controlled intelligently by the slip generator 320, different values for the positive and negative torque values 234 and 232 may be applied to respective ones of the wheels of the front and rear axles 532 and 542. In this regard, although the same positive torque value 234 may be applied to the front wheels 534 since the front axle 532 is powered by the same motor (i.e., front electric motor 530) any desired slip may be caused by applying a brake (i.e., negative torque value 232) to the inside front wheel. Similarly, although the same positive torque value 234 may be applied to the rear wheels 544 since the rear axle 542 is powered by the same motor (i.e., rear electric motor 540) any desired slip may be caused by applying the brake assembly 560 (i.e., negative torque value 232) to the inside rear wheel.

The modified turn radius 520 illustrates the expected decrease in turn radius that can be expected by applying the negative torque value 232 to the inside one of the rear wheels 544 via the brake assembly 560 during the turn. As shown in FIG. 5, the positive torque value 234 applied to the front wheels 534 pulls the vehicle 500 through the turn while the negative torque value 232 applied to the inside one of the rear wheels 544 via the brake assembly 560 increases the yaw rate to cause turning at the modified turn radius 520, which is smaller than the normal turn radius 510.

Referring now to FIG. 6, a BEV 600 (as another example of vehicle 110) is shown while conducting a turn. A normal (unmodified) turn radius 610 is shown for comparison to a modified turn radius 620. The BEV 600 has a separate instance of a front electric motor 630 on the front axle 632 for each respective one of the front wheels 634. The BEV 600 also has a separate instance of a rear electric motor 640 on the rear axle 642 for each respective one of the rear wheels 644. However, it should be appreciated that example embodiments may also apply to a BEV with three electric motors (e.g., one motor for one of the front or rear axle, and two motors for individual wheels of the other axle). The BEV 600 also has a controller 650 (e.g., an example of controller 140) that controls the application of power (via the positive and negative torque values 234 and 232 of FIG. 2) to the front and rear axles 632 and 642. In an example embodiment, the controller 650 may execute control (e.g., via the slip generator 320) over balancing the application of power to the each individual one of the front electric motors 630 and the rear electric motors 640, and thereby also to each individual respective wheel.

Each of the front wheels 634 and rear wheels 644 may also have a corresponding friction brake and/or regenerative brake assembly associated therewith. The inside rear wheel for the turn demonstrated includes a brake assembly 660 that can be individually operated to provide the negative torque value 232 discussed above. When a reduced turning radius is desired, and conditions described above in reference to FIG. 2 are met, the torque control module 130 described above may operate in similar fashion to the description above. However, since the front and rear electric motors 630 and 640 are individually controllable, the front wheels 634 can be individually controlled (for slip) by the slip generator 320) and the rear wheels 644 can also be individually controlled (for slip) by the slip generator 320 as described above. Accordingly, the controller 650 individually controls respective wheels on the front and rear axles 632 and 642 with respect to application of the positive torque value 234 (and amount thereof) applied to each wheel, and the negative torque value 232 applied to the brake assembly 660 or via reverse operation of the inside rear electric motor 640 at the inside one of the rear wheels 644. The controller 650 thereby manages torque for each individual wheel and, in an example embodiment, the outside front wheel 634 may move faster than the inside front wheel 634, and the outside rear wheel 644 may move faster than the inside rear wheel 644. The inside rear wheel 644 may generally always be the slowest wheel, and the inside front wheel 634 may be the second slowest wheel. The outside front and rear wheels 634 and 644 may have the same or different speeds.

The modified turn radius 620 illustrates the expected decrease in turn radius that can be expected by applying the negative torque value 232 to the inside one of the rear wheels 644 via the brake assembly 660 or via operating the electric motor 640 in reverse during the turn. As shown in FIG. 6, the positive torque value 234 that may be evenly or unevenly applied to the front wheels 634 pulls the BEV 600 through the turn while the negative torque value 232 applied to the inside one of the rear wheels 644 (e.g., via the brake assembly 660 or via operating the electric motor 640 in reverse during the turn) increases the yaw rate to cause turning at the modified turn radius 620, which is smaller than the normal turn radius 610.

As can be appreciated from the descriptions above, example embodiments may enable speeding up of outside wheels relative to inside wheels during a turn. This relative speeding up can be done on either the front or the rear wheels, or on both. Moreover, the relatively speeding up may be performed by differential torque applications that involve either different positive torques being applied to each wheel, or the application of a positive torque to pairs of wheels, and then the application of a negative torque to only one wheel of the pair (i.e., the inside wheel).

Example embodiments also select the differential speed strategy to be applied at least in part based on the surface on which the vehicle operates. Thus, for example, a greater speed differential may be applied on dirt than would be applied on asphalt. In some cases, the road surface type may be determined by local sensors. However, in other cases, GPS location may be used to determine the road surface type (e.g., based on whether the location corresponds to the location of a road, and the road surface being known). Accordingly, optimal speed differentials may be selected based on geo-fenced road surface identification. The identification may occur automatically or by triggering initiated by the operator (e.g., selection of an operating mode that indicates the road surface type). In some cases, wheel speed differential may have multiple settings for each surface (e.g., aggressive, minimal tread, reduced tire wear, etc.).

FIG. 7 illustrates a block diagram of one example method of providing automated application of turn radius reduction in a turn assist mode. The method may include receiving a mode selection selecting a turning radius reduction mode and receiving steering wheel angle at operation 700 and vehicle speed information to determine if turn radius reduction criteria are met during a turn at operation 710. The method may further include determining a surface type on which the vehicle is operating at operation 720 and, in response to the turn radius reduction criteria being met, applying a torque differential to at least an inside rear wheel and an outside rear wheel of the vehicle based on the steering wheel angle, the vehicle speed information and the surface type at operation 730.

Example embodiments may therefore also include a vehicle control system for reducing turn radius of a vehicle. The system may include electric motors (e.g., front and rear electric motors) associated with front and rear wheels of the vehicle. The system may further include a plurality of vehicle sensors to receive information including driving surface type, vehicle speed and handwheel position. The system may also include a controller operably coupled to the electric motors and the sensors to control wheel slip during a turn based on the driving surface type, the vehicle speed and the handwheel position.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, a torque control module may be operably coupled to the controller and to front wheels of the vehicle and rear wheels of the vehicle. The torque control module may be operable, responsive to control by the controller, to selectively apply different torque values to at least an inside one of the rear wheels relative to an outside one of the rear wheels. In an example embodiment, the controller may be configured to control vehicle operation in any of a plurality of operator selectable modes of operation, and the torque control module may be configured to apply the different torque values during the turn responsive to operator selection of a corresponding one of the modes of operation and detection of a trigger event. In some cases, the trigger event may include detecting a steering wheel angle of the handwheel being at a maximum angle that corresponds to a limit of rotation of the handwheel, and an application of additional torque to the handwheel at the limit of rotation. In an example embodiment, speed changes associated with the applying the different torque values may change nonlinearly with respect to changes in the application of the additional torque to the handwheel. In some cases, selectively applying the different torque values may include applying a negative torque to the inside rear wheel and applying a positive torque to the front wheels and the outside rear wheel during the turn. In an example embodiment, the negative torque may be applied by operating an electric motor associated with the inside rear wheel in a reverse direction. In some cases, selectively applying the different torque values may include applying a different torque to each of the front wheels and each of the rear wheels. In an example embodiment, the controller may be configured to control wheel slip based on a selected slip table from a plurality of slip tables, the selected slip table defining an amount of slip between an inside wheel and an outside wheel of one or both of the front wheels and the rear wheels. In some cases, the selected slip table may be chosen based on the driving surface type. In an example embodiment, the driving surface type may be determined locally at the vehicle based on surface information provided by a surface sensor, which may be a camera. In some cases, the driving surface type may be determined based on a mode selection made by a driver of the vehicle or based on a location of the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. A vehicle control system comprising:
electric motors associated with front and rear wheels of the vehicle;
a plurality of vehicle sensors to receive information including driving surface type, vehicle speed and handwheel position;

a controller operably coupled to the electric motors and the sensors to control wheel slip during a turn based on the driving surface type, the vehicle speed and the handwheel position; and a torque control module operably coupled to the controller and to front wheels of the vehicle and rear wheels of the vehicle, wherein the vehicle control system further comprises a plurality of operator selectable modes of operation that each define respective different functions, wherein the torque control module applies different torque values during the turn responsive to operator selection of a corresponding one of the modes of operation and detection of a trigger event, and wherein the trigger event comprises detecting that a limit of rotation of a handwheel is reached when a current steering wheel angle of the handwheel is equal to a maximum steering wheel angle, and responsive to the detecting the limit of rotation of the handwheel is reached, measuring additional torque placed on the handwheel to apply the different torque values based on the additional torque measured.

2. The system of claim 1, wherein responsive to control by the controller, the torque control module selectively applies the different torque values to at least an inside one of the rear wheels relative to an outside one of the rear wheels.

3. The system of claim 2, wherein selectively applying the different torque values comprises applying a negative torque to the inside rear wheel and applying a positive torque to the front wheels and the outside rear wheel during the turn.

4. The system of claim 3, wherein the negative torque is applied by operating an electric motor associated with the inside rear wheel in a reverse direction.

5. The system of claim 2, wherein selectively applying the different torque values comprises applying a different torque to each of the front wheels and each of the rear wheels.

6. The system of claim 1, wherein speed changes associated with the applying the different torque values change nonlinearly with respect to changes in the application of the additional torque to the handwheel.

7. The system of claim 1, wherein the controller controls wheel slip based on a selected slip table from a plurality of slip tables, the selected slip table defining an amount of slip between an inside wheel and an outside wheel of one or both of the front wheels and the rear wheels.

8. A vehicle control system comprising:
electric motors associated with front and rear wheels of the vehicle;
a plurality of vehicle sensors to receive information including driving surface type, vehicle speed and handwheel position; and
a controller operably coupled to the electric motors and the sensors to control wheel slip during a turn based on the driving surface type, the vehicle speed and the handwheel position, wherein a torque control module is operably coupled to the controller and to the front wheels and rear wheels of the vehicle wherein the controller controls wheel slip based on a selected slip table from a plurality of slip tables, the selected slip table defining an amount of slip between an inside wheel and an outside wheel of one or both of the front wheels and the rear wheels, and wherein the selected slip table is chosen based on the driving surface type, wherein the torque control module applies different torque values during the turn responsive to operator selection of a corresponding one of the modes of operation and detection of a trigger event, and wherein the trigger event comprises detecting that a limit of rotation of a handwheel is reached when a current steering wheel angle of the handwheel is equal to a maximum steering wheel angle, and responsive to the detecting the limit of rotation of the handwheel is reached, measuring additional torque placed on the handwheel to apply the different torque values based on the additional torque measured.

9. The system of claim 8, further comprising:
a torque control module operably coupled to the controller and/or to front wheels of the vehicle and rear wheels of the vehicle, the torque control module being operable, responsive to control by the controller, to selectively apply different torque values to at least an inside one of the rear wheels relative to an outside one of the rear wheels, wherein the controller controls vehicle operation in any of a plurality of operator selectable modes of operation, and wherein the torque control module applies the different torque values during the turn responsive to operator selection of a corresponding one of the modes of operation and detection of a trigger event.

10. The system of claim 8, wherein the driving surface type is determined locally at the vehicle based on surface information provided by a surface sensor.

11. The system of claim 10, wherein the surface sensor is a camera.

12. The system of claim 8, wherein the driving surface type is determined based on a mode selection made by a driver of the vehicle.

13. The system of claim 8, wherein the driving surface type is determined based on a location of the vehicle.

14. A method of providing automated application of turn radius reduction for a vehicle, the method comprising:
receiving a mode selection selecting a turning radius reduction mode;
receiving steering wheel angle and vehicle speed information to determine if turn radius reduction criteria are met during a turn;
determining a surface type on which the vehicle is operating; and
in response to the turn radius reduction criteria being met, applying a torque differential to at least an inside rear wheel and an outside rear wheel of the vehicle based on a steering wheel angle, vehicle speed information, the surface type and a selected mode of operation, wherein a torque control module applies different torque values during the turn responsive to operator selection of a corresponding one of the modes of operation and detection of a trigger event, and wherein the trigger event comprises detecting that a limit of rotation of a handwheel is reached when a current steering wheel angle of the handwheel is equal to a maximum steering wheel angle, and responsive to the detecting the limit of rotation of the handwheel is reached, measuring additional torque placed on the handwheel to apply the different torque values based on the additional torque measured.

15. The method of claim 14, wherein determining the surface type on which the vehicle is operating comprises determining the surface type locally at the vehicle based on surface information provided by a surface sensor.

16. The method of claim 14, wherein determining the surface type on which the vehicle is operating comprises determining the surface type based on the mode selection.

17. The method of claim 14, wherein determining the surface type on which the vehicle is operating comprises determining the surface type based on a location of the vehicle.

18. The method of claim 14, wherein applying the torque differential further comprises applying the torque differential also to an inside rear wheel relative to an outside rear wheel of the vehicle.

19. The method of claim 14, wherein applying the torque differential comprises applying a positive torque to the outside rear wheel and applying a negative torque to the inside rear wheel.

* * * * *